United States Patent [19]

Miura

[11] Patent Number: 5,339,328
[45] Date of Patent: Aug. 16, 1994

[54] SOLID-STATE LASER

[75] Inventor: Hiroshi Miura, Tokyo, Japan

[73] Assignee: Nec Corporation, Japan

[21] Appl. No.: 942,289

[22] Filed: Sep. 9, 1992

[30] Foreign Application Priority Data

Sep. 18, 1991 [JP] Japan .................. 3-237540

[51] Int. Cl.⁵ ............................................. H01S 3/091
[52] U.S. Cl. ........................................ 372/70; 372/71;
372/72; 372/6; 372/92
[58] Field of Search ................ 378/6, 70, 71, 72, 92

[56]  References Cited

U.S. PATENT DOCUMENTS

| 4,555,786 | 11/1985 | Byer ....................... 372/34 |
| 4,567,597 | 1/1986 | Mandella ................. 372/34 |
| 4,785,459 | 11/1988 | Baer . | |
| 4,833,682 | 5/1989 | Byer et al. .............. 372/34 |
| 4,908,832 | 3/1990 | Baer ....................... 372/34 |
| 5,202,893 | 4/1993 | Kubota et al. ............ 372/6 |

Primary Examiner—Georgia Y. Epps
Attorney, Agent, or Firm—Laff, Whitesel, Conte & Saret

[57] ABSTRACT

An laser with improved output power is provided. The laser comprises: a cylindrical laser medium mounted on the shaft of a motor; a resonator including a pair of mirrors provided adjacent the opposite ends of the cylindrical face of the laser medium; and a multiplicity of laser diodes angularly spaced along the circumference of the cylindrical medium and upstream of the resonator in the sense of the rotation. The laser diodes optically pump regions of the medium facing the diodes. By rotating the cylindrical medium at a high speed, the pumped region of the medium will be brought into the resonator within the life lime of excitation, thereby increasing inverted distribution of energy per unit time. The pumped regions sequentially undergo laser emission, providing increased laser output power.

6 Claims, 3 Drawing Sheets

SOLID-STATE LASER

FIELD OF THE INVENTION

The invention relates to solid-state lasers, and more particularly to solid-state lasers pumped by laser diodes (simply referred to as solid-state lasers hereinafter).

BACKGROUND OF THE INVENTION

In a solid-state laser, laser diodes function as efficient means for exciting solid-state laser medium. This is due to the fact that a wavelength of the light emitted from the laser diodes may be selected to match an absorption wavelength of the laser medium of interest. This implies that parasitic absorption of light, i.e. absorption not participating laser oscillation, is very little, so that little thermal expansion of the medium will take place, resulting in only negligible "lense effect" which causes local convergence of light. Thus, laser diode pumped solid-state lasers may easily carry out emission of a single mode transverse light waves. A further advantage of the laser diode pumped solid-state lasers is that they may be manufactured in compact and light forms, and have long life.

Presently, however, laser diode pumped solid-state lasers have the following difficulties. They are that: (1) the pumping power of the light source, i.e. laser diodes, is not high for optical pumping of a solid laser medium, and (2) absorption coefficient of laser medium is small, obstructing the realization of a high power laser. The second problem (2) arises because active ions such as $Nd^{3+}$ that can participate in laser light emission may be doped in a host medium to only limited concentration. This is also the case when YAG crystal is used as a host medium. To overcome these problems, efforts have been directed mainly to develop: (A) a laser medium having a high optical absorption coefficient and a high pumping efficiency, and (B) an excitation scheme for efficient pumping of the medium by laser diodes. In pursuit of a solution to the first object (A) above, effort has been made mainly to find a best arrangement of a multiplicity of laser diodes for optimum optical pumping. For the second object (B), improvements made in the past are based on provision of a longest optical path possible for the light beam to be absorbed by the medium.

FIG. 1 illustrate a prior art laser developed to overcome some of these disadvantages. In this arrangement a multiplicity of laser diodes 1 provide pumping light, which is collected at a focus of a lense 3 by a bundle of optical fibers 2, which light is in turn collected on a laser medium 5 by a lense 4. An optical resonator comprises a partially transmitting mirror 6 and a totally reflecting mirror 7 at the laser oscillating wave length. Mirror 7 is transparent for the pumping light from the laser diodes so that the incident pumping light from the laser diodes penetrates into the medium 5. Lasers of this type are called end-pumped solid-state lasers because they perform optical pumping with light entered the medium at the opposite end face of the medium. Advantageously, they have a pumping region which coincides with a region where oscillatory emission modes are established, so that the clear problem of lens effect mentioned above and may provide a high power single transverse mode. Since the incident light enters the medium from its longitudinal end, they also attain the second object (B).

FIG. 2 illustrate another prior art laser, in which beams of pumping light emitted from "a diode bar" 11, which is a multiplicity of laser diodes, are collimated by a fiber lense 12 onto a long side face of a laser medium 13. The laser medium is a $Nd^{3+}$ YAG crystal having dimensions of, for example, $3 \times 5 \times 20$ mm. The face of the medium receiving the incident light is provided with a coat which may totally reflect YAG laser light whose wavelength is 1.06 microns, but is transparent for the pumping light whose wavelength is about 0.8 microns. Mirrors 14 and 15 together constitute a resonator. Lasers of this type are called side-pumped solid-state lasers. Since they have a long zig-zag optical path 16 over the entire length of the medium 13 excited by the multiple diode lasers, they may provide high output laser power.

As discussed above, either type of prior art lasers have some improvements on output power through improved designs in configuration and dimension of laser medium, and improved arrangements of pumping laser diodes. However, in the case of $Nd^{3+}$ YAG crystal laser, maximum laser output power rate (i.e. output power per unit volume of laser medium) is limited by $Nd^{3+}$ concentration in the YAG crystal. Maximum concentration of $Nd^{3+}$ doped in the YAG crystal is at most a few per cent. The maximum power rate cannot be improved by any excitation scheme. Although it has been reported recently that $LiNdP_4O_{14}$ can be better host for $Nd^{3+}$ at higher concentration thereof, the maximum laser output power rate is still limited by the concentration of the $Nd^{3+}$ ions.

SUMMARY OF THE INVENTION

An object of the invention is, therefore, to provide an improved laser diodes pumped solid-state laser capable of providing higher laser output power rate than conventional one by substantially eliminating the prior art limit determined by the concentration of active ions in the host medium.

In order to attain this object a solid-state laser of this invention includes: a laser medium which is optically excitable for laser light emission, a multiplicity of laser diodes for optically pumping said laser medium, and a resonator in the form of a pair of mirrors in a resonance-emission region for optically resonating said pumped medium in said resonance-emission region, and comprises: means for optically pumped regions in said laser medium, but outside said resonance-emission region, which regions are irradiated by light emitted from said laser diodes, and means for sequentially moving to said resonance-emission region within a life time of excitation of said pumped regions for emission of laser light.

With this construction, although laser output power rate (i.e. output power per unit volume of laser medium) cannot exceed known upper limit, significant improvement may be achieved in laser output power from the resonance-emission region due to enhanced inverted population of ions in higher energy state.

A concrete example of the laser according to the invention comprises: a cylindrical solid-state laser medium; a motor for rotating said laser medium about the central axis thereof; a resonator in the form of a pair of mirrors mounted adjacent opposite flat ends of said cylindrical medium so as to optically resonate the portion of said cylindrical solid-state laser medium between said mirrors; a multiplicity of stationary laser diodes facing one of said flat ends of said cylindrical medium, said laser diodes angularly spaced along the circumference of said cylindrical medium upstream of said mirrors in the sense of the rotation of the laser medium.

In this example, the laser preferably comprises a mirror facing the other flat end of said cylindrical medium, for reflecting light emitted from said laser diodes and passing through said cylindrical medium.

This mirror enables the pumping light to pass through the laser medium twice, thereby increasing absorption of the light by the medium.

In the example above, it is also preferable to provide beams of light emitted from said laser diodes in the form of spot lights each having a dimension corresponding to the dimension of said resonance-emission region.

Such spot lights may irradiate only pumping regions of the medium, allowing efficient laser light emission by the medium.

In addition, it is preferable to have the multiplicity n of said laser diodes, diameter d of said laser diodes, life time t of excitation, radius r and angular velocity $\omega$ of said medium chosen to satisfy an inequality $$n < tr\omega/d.$$

According to this formula, unnecessary laser diodes will be eliminated.

A suitable solid-state laser medium for the laser mentioned above is a YAG crystal doped with $Nd^{3+}$.

DETAILED DESCRIPTION OF THE PREFERRED EMBODIMENT

Figure 1:
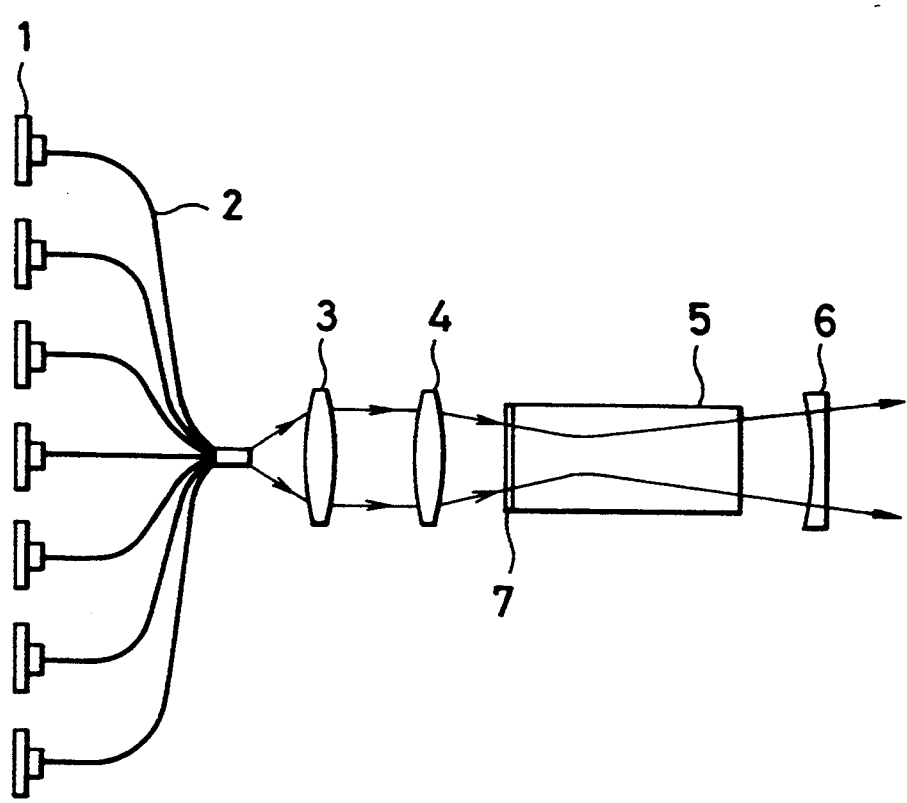
FIG. 1 is a major construct of a prior art end-pumped type solid-state laser utilizing laser diodes.
Figure 2:
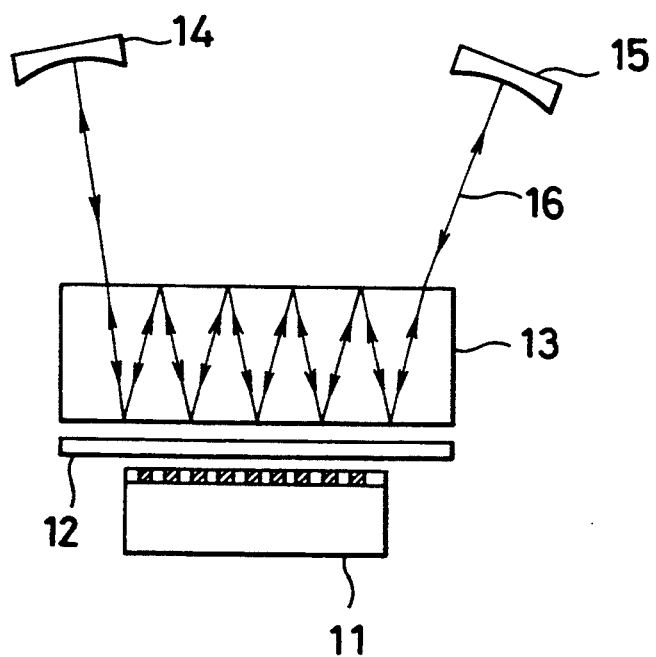
FIG. 2 is a major construction of another prior art side-pumped type solid-state laser utilizing laser diodes.
Figure 3A:
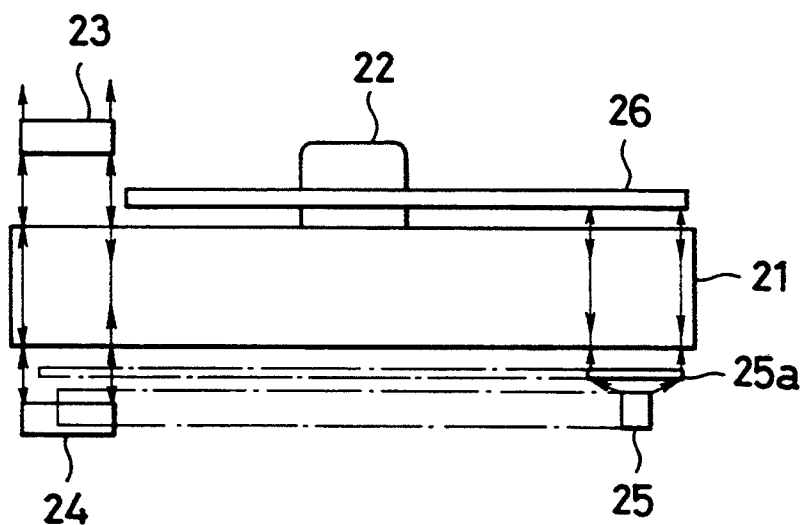
FIGS. 3A and together shows a major construction of a solid-state laser utilizing laser diodes according to the invention, with a front view shown in FIG. 3A and a bottom view shown in FIG. 3B.
Figure 3B:
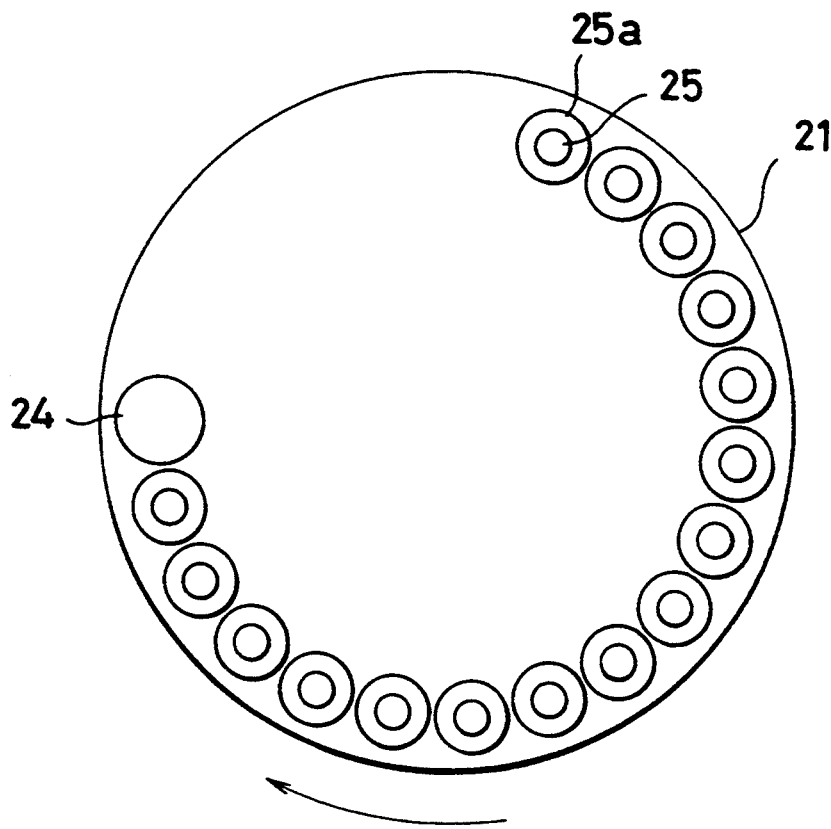

The invention is now described by way of example with reference to FIG. 3. A cylindrical laser medium 21 is a YAG crystal doped with $Nd^{3+}$. The laser medium 21 is coaxially mounted on a drive shaft of a motor 22 for rotational motion about the central axis of the medium 21. Provided at opposite flat ends of the medium 21 are a pair of mirrors 23 and 24 facing each other. The mirror 24 has a mirror surface for totally reflecting the light impinging thereon, while the mirror 23 has a mirror surface which partially transmits laser light emitted by the medium. The mirrors 23 and 24 together form a resonator for the portion of the laser medium placed in the region. The resonator will cause the portion to undergo laser emission. This region of the medium for resonated pumping and emission will be referred to as resonance-emission region.

Fixedly mounted beneath a bottom flat face of the laser medium 21 are a predetermined number of laser diodes 25, each facing said face to irradiate said laser medium. They are angularly spaced along the circumference of the cylindrical laser medium upstream of the mirror 24 in the sense of the rotation of the laser medium. Thus the laser diodes 25 create pumped regions in rotating medium. The spatial region where such pumping is performed will be referred to as pumping region.

Another total-reflection mirror 26 is provided above the mirror 21 so as to reflect the light emitted from the laser diodes 25 and passing through the cylindrical medium, thereby causing the light to be transmitted through the medium twice and enhancing the absorption of light by the laser medium 21.

In this arrangement the laser medium 21 is quickly rotated by a motor 22 while irradiating laser medium by respective laser diodes 25. Such irradiation stimulates the irradiated portion to a high-energy state. The rotation brings the pumped portions of the medium 21 to the resonance-emission region within a period shorter than the life time of the excitation (i.e. before they undergo transition from excited energy levels to a lower energy state). They finally undergo emission of laser light. In this manner a total amount of volume per unit time subjected to laser emission is increased, providing an increased laser output power.

In order to carry out the above pumping most efficiently, it is preferable to create a pumped region equal in dimension to the resonance-emission region. To this end the size of a beam from any one of the laser diodes impinging on the medium 21 is preferably set up to match the size of the mirror 23 of the resonator. This can be done by dispersing the beam into a uniform spot light having a required dimension by means of a lense 25a placed in front of the laser diode 25, as shown in FIG. 3A. Alternatively, the portion of the totally reflective mirror 26 reflecting the pumping light from a corresponding laser diode 25 may be a concave mirror designed so as to cast the reflected light into a parallel beam of light in the laser medium 21.

It is recommended for economy of input power to choose the multiplicity n of the laser diodes such that $$n < tr\omega/d,$$

where d is the diameter of the spot light; t, the life time of excited ions undergoing laser transitions; r, the diameter of the cylindrical medium; and $\omega$, the angular velocity of the medium. This formula is derived from the following conditions: The arcuate length of the path for n laser diodes 25 approximately equals nd. On the other hand, the linear velocity of the laser medium 21 is $r\omega$. The period required for the region pumped by the farthest laser diode to reach the resonance-emission region or the mirrors 23 and 24 is $nd/r\omega$, which must be shorter than the life time t. Thus, the above formula obtains.

It should be noted that it is not necessary to fabricate the entire medium 21 with YAG crystal: it is only necessary to use YAG crystal in those areas covered by the pumping beams of light. Thus, YAG crystal may be used in an annular portion of the medium.

A linear array of YAG crystal may be also used. In this case the array may be reciprocated so that the regions pumped by laser diodes may be moved to the resonance-emission region.

I claim:

1. A solid-state laser including a laser medium which is optically excitable for giving a laser light emission, a multiplicity of laser diodes for optically pumping said laser medium, and a resonator in the form of a pair of mirrors in a resonance-emission region for optically resonating said pumped medium in said resonance-emission region, said laser comprising:

means for optically pumping regions of said laser medium, outside said resonance-emission region, by irradiating light emitted from said laser diodes, and means for sequentially moving said laser medium pumped with laser diodes into said resonance-emission region within a life time of said laser medium from outside of said resonance emission region to increase laser output power.

2. A solid-state laser, comprising:

a cylindrical solid laser medium having a circumference;

a motor coupled for rotating said laser medium about a central axis of said laser medium;

a resonator in the form of a pair of mirrors mounted to face opposite flat ends of said cylindrical medium so as to optically resonate a portion of said cylindrical solid laser medium between said mirrors;

a multiplicity of stationary laser diodes mounted adjacent to one of said mirror and over one of said flat ends to face said one face, said laser diodes being angularly spaced along the circumference of said cylindrical medium and upstream of said mirrors in the sense of the rotation of the laser medium.

3. A laser according to claim 2, further comprising a mirror facing the other flat end of said cylindrical medium, for reflecting light emitted from said laser diodes and passing through said cylindrical medium.

4. A laser according to claim 2, wherein beams of light emitted from said laser diodes are irradiated on said optical pumping regions in the form of spot lights each having a dimension corresponding to the dimension of said resonance-emission region.

5. A laser according to claim 2, wherein the multiplicity n of said laser diodes, diameter d of said laser diodes, life time t of excitation, radius r and angular velocity $\omega$ of said medium are chosen to satisfy an inequality $$n < tr\omega/d.$$

6. A laser according to claim 2, wherein said laser medium is a YAG crystal doped with $Nd^{3+}$.

* * * * *